(12) United States Patent
Wintgens et al.

(10) Patent No.: US 10,408,133 B2
(45) Date of Patent: Sep. 10, 2019

(54) ACCESSORY DRIVE SYSTEM FOR A GAS TURBINE ENGINE

(71) Applicant: Pratt & Whitney Canada Corp., Longueuil (CA)

(72) Inventors: Eric Wintgens, Montreal (CA); Jean Dubreuil, Boucherville (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 784 days.

(21) Appl. No.: 14/505,874

(22) Filed: Oct. 3, 2014

(65) Prior Publication Data

US 2016/0097328 A1    Apr. 7, 2016

(51) Int. Cl.
| | |
|---|---|
| *F02C 7/32* | (2006.01) |
| *F02C 3/04* | (2006.01) |
| *B64D 13/06* | (2006.01) |
| *B64D 33/00* | (2006.01) |

(52) U.S. Cl.
CPC ................ *F02C 7/32* (2013.01); *B64D 13/06* (2013.01); *B64D 33/00* (2013.01); *F02C 3/04* (2013.01); *B64D 2013/0644* (2013.01); *F05D 2220/76* (2013.01); *Y02T 50/56* (2013.01)

(58) Field of Classification Search
CPC ... F02C 7/32; F02C 3/04; B64D 13/00; B64D 13/40; B64D 2013/0611; B64D 2033/0213; B64D 2041/002; F02N 11/0862; F05D 2220/76
See application file for complete search history.

(56) References Cited

U.S. PATENT DOCUMENTS

| | | | |
|---|---|---|---|
| 4,077,202 A | 3/1978 | Schutze | |
| 4,494,372 A * | 1/1985 | Cronin | B64D 13/06 60/785 |
| 5,172,543 A | 12/1992 | White | |
| 5,174,109 A * | 12/1992 | Lampe | B64D 41/00 60/788 |
| 6,641,084 B1 * | 11/2003 | Huber | B64D 41/00 244/48 |
| 7,439,634 B2 | 10/2008 | Michalko | |

(Continued)

FOREIGN PATENT DOCUMENTS

| | | |
|---|---|---|
| EP | 0472294 | 2/1992 |
| GB | 2216603 A * | 10/1989 |
| WO | WO2008/082336 | 7/2008 |

*Primary Examiner* — David E Sosnowski
*Assistant Examiner* — Brian P Wolcott
(74) *Attorney, Agent, or Firm* — Norton Rose Fulbright Canada

(57) ABSTRACT

The described accessory drive system for a gas turbine engine includes a gearbox driving a plurality of accessories including a cabin air compressor to provide cabin air and an engine starter to start the gas turbine engine. An electrical power supply separate from a main electrical power supply of the gas turbine engine is electrically coupled to the accessories. A clutch selectively engages an output of the gas turbine engine to mechanically couple the output to the gearbox. The clutch operates between an electrical drive state where it disengages from the output and only the electrical power supply provides electrical power to the cabin air compressor and the engine starter, and a mechanical drive state where the clutch engages the output and the gearbox drives at least one of the accessories.

19 Claims, 2 Drawing Sheets

(56) References Cited

U.S. PATENT DOCUMENTS

| | | | |
|---|---|---|---|
| 7,876,542 B2 | 1/2011 | Roxman et al. | |
| 8,146,370 B2 * | 4/2012 | Zeiner | F02C 3/10 |
| | | | 60/778 |
| 8,424,800 B2 * | 4/2013 | Finney | B64D 41/007 |
| | | | 244/53 R |
| 8,461,704 B2 | 6/2013 | McLoughlin et al. | |
| 9,260,976 B2 * | 2/2016 | Phillips | F02C 7/32 |
| 2009/0145998 A1 | 6/2009 | Salyer | |
| 2009/0302152 A1 * | 12/2009 | Knight | B64D 41/00 |
| | | | 244/58 |
| 2010/0319357 A1 | 12/2010 | Gazzino et al. | |

* cited by examiner

ACCESSORY DRIVE SYSTEM FOR A GAS TURBINE ENGINE

TECHNICAL FIELD

The present disclosure relates generally to gas turbine engines, and more particularly, to a system and method for driving the accessories of such engines.

BACKGROUND

Aircrafts have power requirements which are not related to propulsion. These can include ground services, such as providing air to the cabin, providing electrical power for the aircraft's system, and assisting with main engine start. These ground services are generally provided by one or more of the main propulsion gas turbine engines of the aircraft, or an auxiliary power unit (APU) on larger aircraft.

The main propulsion gas turbine engines operate most efficiently while providing propulsion during flight. It is therefore not very efficient to use these gas turbine engines as a source of motive or electrical power for aircraft ground services. For their part, APUs are rarely used during flight and typically serve only to provide ground services. APUs therefore must have systems which duplicate those already present in the main propulsion gas turbine engines. This redundancy increases complexity and costs. Furthermore, APUs are gas turbine engines themselves, and thus produce appreciable noise and combustion emissions when in operation.

SUMMARY

In one aspect, there is provided an accessory drive system for a gas turbine engine having a main electrical power supply, comprising: a gearbox driving a plurality of accessories including at least a cabin air compressor to provide cabin air and an engine starter to start the gas turbine engine; an electrical power supply separate from the main electrical power supply of the gas turbine engine and electrically coupled to the accessories; and a clutch selectively engaging an output of the gas turbine engine to mechanically couple the output to the gearbox, and operating between an electrical drive state wherein the clutch disengages from the output and only the electrical power supply provides electrical power to at least one of the cabin air compressor and the engine starter, and a mechanical drive state wherein the clutch engages the output and the gearbox drives at least one of the accessories.

In another aspect, there is provided a gas turbine engine, comprising: a main electrical power supply; a plurality of accessories including at least a cabin air compressor to provide cabin air, and an engine starter to start the gas turbine engine; an electrical power supply separate from the main electrical power supply and electrically coupled to the accessories; and a clutch selectively engaging an output of the gas turbine engine to mechanically couple the output to the accessories, and operating between an electrical drive state wherein the clutch disengages from the output and only the electrical power supply provides electrical power to at least one of the cabin air compressor and the engine starter, and a mechanical drive state wherein the clutch engages the output and the output drives at least one of the accessories.

In a further aspect, there is provided a method for driving accessories of a gas turbine engine having a main electrical power supply and a separate electrical power supply, comprising: using only the electrical power supply to drive at least one of a cabin air compressor and an engine starter when the gas turbine engine is not operational; and mechanically coupling an output of the gas turbine engine to an accessory gearbox driving at least one of the accessories when the gas turbine engine is operational.

BRIEF DESCRIPTION OF THE DRAWINGS

Reference is now made to the accompanying figures in which.

DETAILED DESCRIPTION

Figure 1:
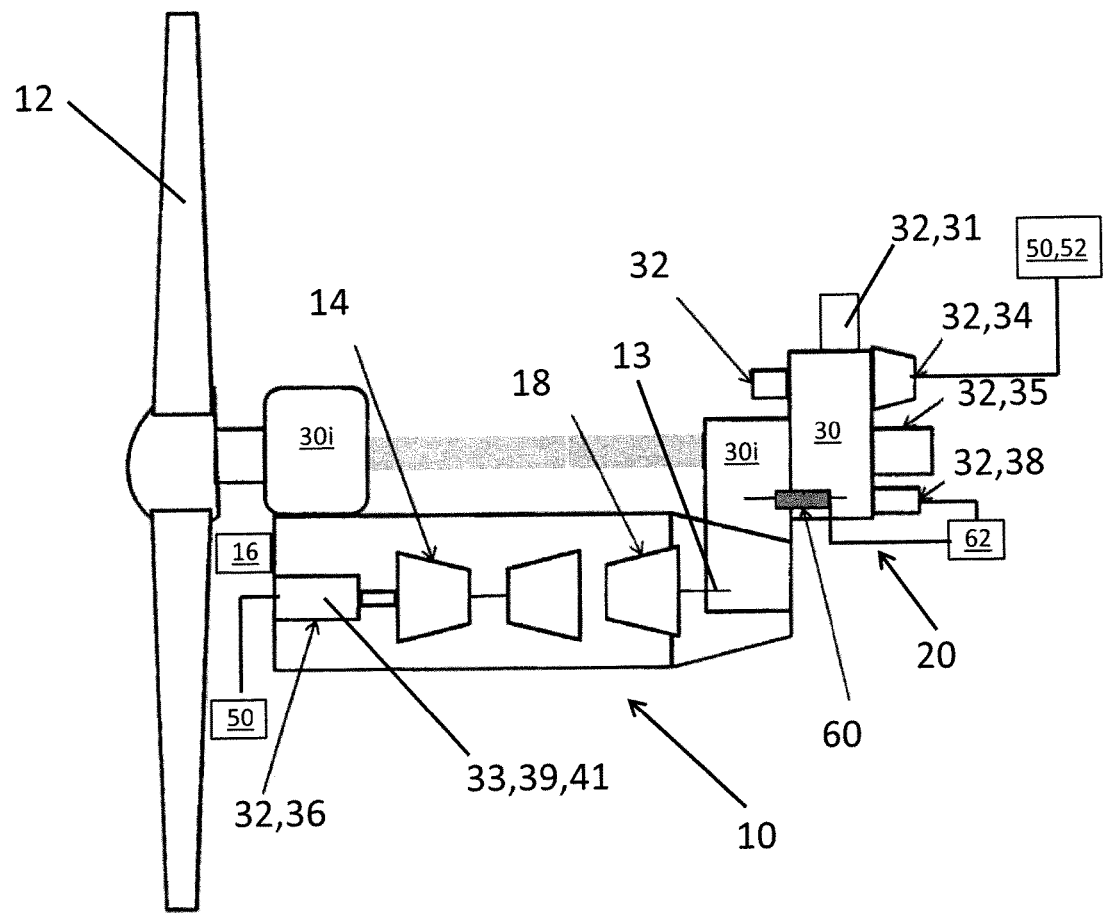
FIG. 1 is a schematic view of a gas turbine engine having an accessory drive system, according to an embodiment of the present disclosure.

FIG. 1 illustrates a gas turbine engine 10 of a type preferably provided for use in subsonic flight, generally comprising in serial flow communication a propeller 12 through which ambient air is propelled, a compressor section 14 for pressurizing the air, a combustor in which the compressed air is mixed with fuel and ignited for generating an annular stream of hot combustion gases, and a turbine section 18 for extracting energy from the combustion gases.

FIG. 1 also shows an accessory drive system 20 (or simply "system 20") for the gas turbine engine 10. The system 20 controls the supply of motive and electrical power to accessories 32 of the gas turbine engine 10 as a function of the operating mode of the gas turbine engine 10. The system 20 thus allows the accessories 32 to be driven in an energy efficient manner. The term "drive" and its derivatives refer to the ability of the system 20 and its components to supply electrical and/or motive power to the accessories 20 so that they can perform their function. The system 20 includes a gearbox 30, an electrical power supply 50, and a clutch 60 which selectively controls the supply of motive power to the accessories 32.

The gearbox 30 is mechanically linked to a mechanical output 13 of the gas turbine engine 10. The mechanical output 13 can be any rotating shaft of the gas turbine engine 10, such as an input shaft from the power turbine or a propeller shaft. Alternatively, the output 13 can be a separate rotating component which is itself mechanically linked to a rotating shaft of the gas turbine engine 10. The gearbox 30 uses gears or gear trains to adapt the speed and torque of the output 13 in order to drive many of the accessories 32 of the gas turbine engine 10. The expressions "mechanically linked" or "mechanically coupled" as used herein refer to the direct connection, or indirect connection (e.g. via gears or a transmission), of components with one another by a suitable mechanical device.

The gearbox 30 is therefore typically an accessory drive gearbox (AGB) 30, which transmits the power from the output 13 through its gears and to the accessories 32. Other types of gearboxes 30 may also be used, alternately or in combination with the AGB 30, and are also within the scope of the present disclosure, such as a reduction gearbox (RGB) 30i. The RGB 30i uses its gearing to lower the speed of the output 13 of the gas turbine engine 10. This allows the gas turbine engine 10 to run at high rotational speeds where it is generally more efficient, while still permitting independent control of the speed of the propeller 12, for example. Similarly, the system 20 can have more than one gearbox 30 for a given gas turbine engine 10, and their location with respect to other components of the aircraft (e.g. the wings) can vary. For example, and as shown in FIG. 1, the system 20 has a front RGB 30i mechanically linked to the propeller 12, and a rear RGB 30i which links the output 13 of the gas turbine engine 10 to an AGB 30, this same AGB 30 being used to drive the accessories 32.

Whichever gearbox 30 is used, most, but not necessarily all, of the accessories 32 are mounted thereto and driven thereby. The term "accessory" refers to a system or device which forms part of the gas turbine engine 10, and which provides a specific non-propulsion function. One of the accessories 32 is a cabin air compressor (CAC) 34, which provides air to the cabin of an aircraft. This can help to lower the aircraft cabin temperature during a cabin pull down operation. Another accessory 32 is an engine starter 36, which helps to start up the compressor section 14 of the gas turbine engine 10 in order to start the gas turbine engine 10. The engine starter 36 is typically only employed when the aircraft is on the ground. Yet another accessory 32 can be a motor/generator 35, which can provide a rotational drive to other accessories 32 when operating as a motor. When it operates as a generator, the motor/generator 35 absorbs a rotational input in order to generate electrical power. Still other examples of accessories 32 include an oil pump 31 and a fuel pump 38. Although the CAC 34 and engine starter 36 will be discussed at length herein, it will be appreciated that the gas turbine engine can also have many other accessories 32, all of which are within the scope of the present disclosure.

The system 20 also includes an electrical power supply 50. The electrical power supply 50 is a source of electric power for the gearbox 30, and can also be used to provide power to the aircraft's systems and to power or light the cabin, among other possible examples. The electrical power supply 50 is a source of electric power which is distinct from a main electrical power supply 16 of the gas turbine engine 10. The main electrical power supply 16 is the principal source of electric power generated by the generator of the gas turbine engine 10 when it is operating. The main electrical power supply 16 can be used to provide electric power to the cabin, flight control systems, and the accessories 32, to name but a few components. The term "separate" as used herein therefore refers to ability of the electrical power supply 50 to supply electric power irrespective of the operating mode of the gas turbine engine 10. The electrical power supply 50 can therefore be a fixed power source located at an airport gate, such as ground accumulators. Alternatively, the electrical power supply 50 can be a mobile source of electricity, such as a ground power cart or unit (GPU). Both these sources of electric power are suitable for servicing the aircraft when it is on the ground.

When the aircraft is airborne, however, these sources of electric power are no longer available. In order to provide a source of electric power throughout the entire operating envelope of the gas turbine engine 10, the electrical power supply 50 must be capable of travelling with the aircraft. The electrical power supply 50 can therefore be provided by fuel cells or solar panels. The electrical power supply 50 can also have, and be provided by, one or more batteries 52. Each battery 52 provides an independent and integrated source of electric power to the gas turbine engine 10 and its other components, thus eliminating the dependence of the gas turbine engine 10 on ground power supplies. Each battery 52 can be of any suitable type, and is preferably one that has a suitably high power density. The batteries 52 can be supplied as a battery pack to improve the total power density of the electrical power supply 50. Each battery 52 can be a component of the gas turbine engine 10, or may alternatively be a component of the aircraft or of the engine nacelle. Each battery 52 is typically not mounted directly to the gearbox 30.

The battery 52 can have a specific duty time before it is exhausted. As an example, the duty time of the battery 52 can be about thirty minutes. This can allow the battery 52 to power the accessories 32 (e.g. CAC 34, engine starter 36, etc.) for the typical amount of time during ground servicing of the aircraft that it takes to disembark passengers and to board new ones. The battery 52 thereby eliminates the need to operate the comparatively inefficient gas turbine engine 10 during that time, and also eliminates the need for an auxiliary power unit (APU). Once exhausted, the battery 52 can be recharged at any desired moment, such as when the gas turbine engine 10 is operating most efficiently in cruise or flight idle, or when the aircraft is on the ground for longer periods.

The system 20 also includes a clutch 60. The clutch 60 is any suitable mechanical device which is operable to selectively engage and disengage the output 13 of the gas turbine engine 10. The clutch 60 mechanically couples, either directly or indirectly, the output 13 of the gas turbine engine 10 to the gearbox 30 via one of its input shafts. Through this selective engagement, the clutch 60 allows the electrical power supply 50 to drive the accessories 30, both with and without assistance from the output 13. As such, the clutch 60 can be referred to as a "one-way" clutch 60 because it allows rotational drive to be supplied by the output 13 of the gas turbine engine 10 to the gearbox 30 and thus to the accessories 32, but prevents the electrically-driven accessories 32 from driving the output 13.

Such a one-way clutch 60 may be a "sprag" clutch 60, which automatically engages or disengages the output 13 based on the relative speed between the output 13 and an electrical drive at the other end of the clutch 60. For example, assuming the gear train of the electrical drive is connected to an outer race of the clutch 60 and the output 13 is connected to an inner race of clutch 60, the output 13 would be disengaged in any condition where the outer race of the clutch 60 is electrically driven to a speed higher than the speed at which the output 13 drives the inner race of clutch 60.

The operation of the clutch 60 can also be controlled by a suitable controller as a function of many parameters, such as the power-consumption of the gas turbine engine 10, and the remaining duty time of the batteries 52. The clutch 60 operates between an electrical drive state and a mechanical drive state, both of which are now described.

In the electrical drive state, one or more of the accessories 32 has signaled that there is a need for electric power. This may occur when the gas turbine engine 10 is in a low power state, such as when the gas turbine engines 10 are not operational during aircraft ground servicing. In such a situation, the electrical power supply 50 can supply electric power to drive the accessories 32 and to light the cabin, for example. The accessories 32 may also signal a need for electric power at times of peak power demand, such as when it is desired to offload the power required of the gas turbine engine 10.

Regardless of the reasons for signalling, the clutch 60 is disengaged from the output 13 of the gas turbine engine 10 in the electrical drive state. The electrical power supply 50 is therefore the only source of electric power used to drive the CAC 34 and/or the engine starter 36. For example, the electrical power supply 50 can be used to drive the CAC 34 to complete cabin pull down in order to cool the cabin of the aircraft. Similarly, the electrical power supply 50 can also be used to power the engine starter 36 so that it can spool up the low-pressure compressor 14, in order to start the gas turbine engine 10. The electrical power supply 50 can also drive any of the other accessories 32 of the gas turbine engine 10 as well.

In the mechanical drive state, the gas turbine engine 10 is operating in a relatively efficient power regime (e.g. cruise, flight idle, etc.), and can thus be used to drive the accessories 32 directly. The clutch 60 therefore engages the output 13 and provides a mechanical link between the output 13 of the gas turbine engine 10 and its accessories 32 via the gearbox 30. The output 13 is therefore able to drive directly, or indirectly via a transmission, the CAC 34 and other accessories 32. Since the clutch 60 is "one-way", the electrical power supply 50 can complement the drive provided by the output 13. For example, if the electrical power supply has batteries 52 that have not been exhausted by being used for aircraft ground servicing, they can be used to provide lighting for the cabin while the output 13 of the gas turbine engine 10 drives the CAC 34 as well as the other accessories 32. This can help to offset the power load of the gas turbine engine 10.

The transitioning of the clutch 60 between the electrical drive state and the mechanical drive state can be effected with a control unit 62. The control unit 62 communicates electronically, mechanically, or both with the clutch 60 and the electrical power supply 50 in order to govern the manner by which the clutch 60 engages the output 13, and the accessories 32 are powered. The control unit 62 may receive input signals from the accessories 32 in order to indicate when it is desirable to be in the electrical drive state.

Alternatively, the transitioning of the clutch 60 between the electrical drive state and the mechanical drive state can be effected based on the relative speeds of the drives connecting to the clutch 60. For example, and as explained above, the clutch 60 can automatically engage or disengage the output 13 based on the relative speed between the output 13 and an electrical drive at the other end of the clutch 60. Take, for example, an embodiment where the gear train of the electrical drive is connected to an outer race of the clutch 60 and the output 13 is connected to an inner race of clutch 60. The output 13 would be disengaged in any condition where the outer race of the clutch 60 is electrically driven to a speed higher than the speed at which the output 13 drives the inner race of clutch 60.

Various possible configurations of the gearbox 30 will now be described with reference to FIGS. 2 and 3.

Figure 2:
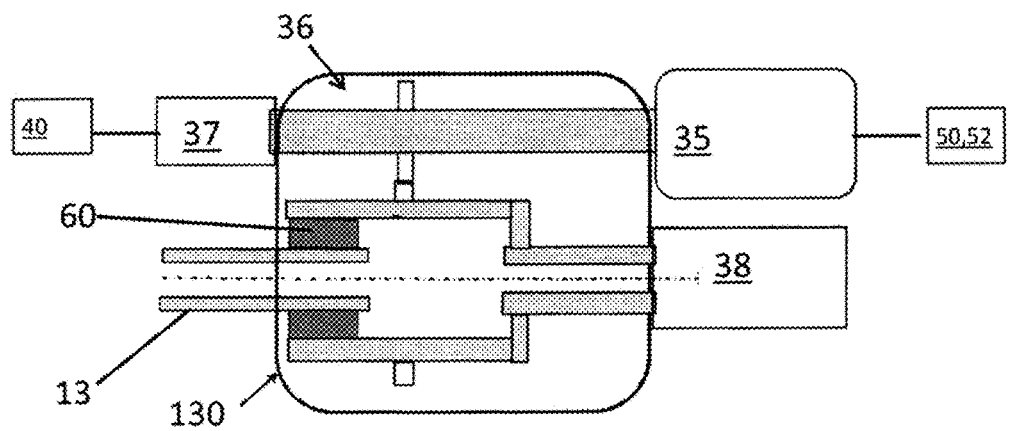
FIG. 2 is a schematic view of a gearbox of a gas turbine engine, according to another embodiment of the present disclosure.

FIG. 2 illustrates generally a gearbox 130 having multiple accessories mounted thereto, which are mechanically linked together via the clutch 60. As with the gearbox 30 of FIG. 1, the gearbox 130 of FIG. 2 can be an AGB, a RGB, or another type of gearbox. The accessories shown in FIG. 2 include a motor/generator 35, a hydraulic pump 37, and a fuel pump 38. In this embodiment, the engine starter 36 includes the motor/generator 35, the hydraulic pump 37, and a hydraulic starter 39 (see FIG. 1). In order to reduce its size, the hydraulic pump 37 can have a hydraulic accumulator 40 to accumulate hydraulic fluid. When acting as a motor, the motor/generator 35 is essentially an electric motor which is powered by the electrical power supply 50 or batteries 52. The hydraulic starter 39 is mechanically linked to the shaft of the low-pressure compressor 14 so that the hydraulic starter 39 can drive the shaft of the compressor 14 to start up the gas turbine engine 10 (see FIG. 1). The engine starter 36 is therefore a hydraulic engine starter 36, and operates as follows.

In the electrical drive state (e.g. engine start mode), the batteries 52 power the motor/generator 35, which in turn rotates a motor output shaft which is mechanically coupled to the a hydraulic pump 37. This drives the hydraulic pump 37, which provides hydraulic power (i.e. pressurized hydraulic fluid) to the hydraulic starter 39, and also drives the fuel pump 38 through the internal gearing of the gearbox 130. The hydraulic starter 39 is then able to drive the shaft of the compressor 14. The clutch 60 is disengaged from the output 13, which in this gearbox 130 is the input shaft from the power turbine of the gas turbine engine. The clutch 60 therefore prevents these accessories from affecting the operation of the output 13.

In the mechanical drive state, the clutch 60 engages the output 13 and is rotated thereby. This drives the internal gearing of the gearbox 130, which in turn drives the motor/generator 35 (i.e. to generate electric power to recharge the batteries 52), the fuel pump 38, and the hydraulic pump 37. Since the gas turbine engine 10 is operational, the hydraulic starter 39 is no longer necessary and is therefore decoupled from the compressor 14. The hydraulic pump 37 is therefore free to provide the hydraulic power to other accessories, such as the CAC.

Figure 3:
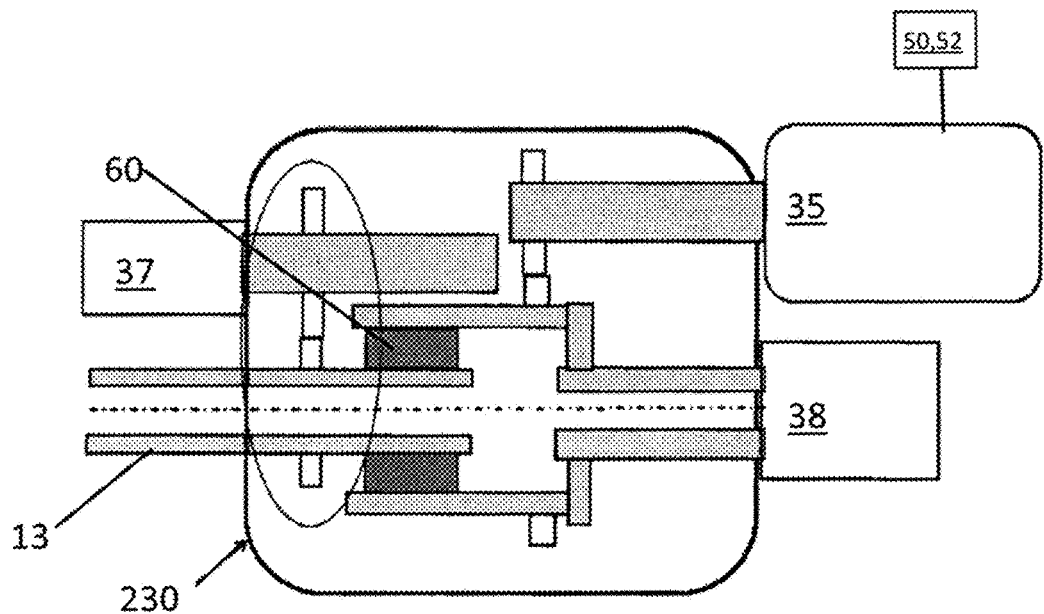
FIG. 3 is a schematic view of another gearbox of a gas turbine engine, according to yet another embodiment of the present disclosure.

FIG. 3 also illustrates a gearbox 230 having multiple accessories mounted thereto, which are mechanically linked together via the clutch 60. As with the gearbox 130 of FIG. 2, the gearbox 230 of FIG. 3 can be an AGB, a RGB, or another type of gearbox. The accessories shown in FIG. 3 include a motor/generator 35, a hydraulic pump 37, and a fuel pump 38. In this embodiment, the engine starter includes an in-line electric starter 33 (see FIG. 1), which is essentially an electric motor whose output is aligned with the shaft of the compressor 14. Such an electric starter 33 can be relatively small and lightweight when compared to other engine starters. The engine starter is therefore an electric engine starter 36, and operates as follows.

In the electrical drive state (e.g. engine start mode), the electrical power supply 50 or batteries 52 power the motor/generator 35, thereby outputting a rotational drive which drives the fuel pump 38 through the internal gearing of the gearbox 230. The batteries 52 are also used to directly supply electric power to the electric starter 33, thereby driving the shaft of the compressor 14 and starting the gas turbine engine 10. The clutch 60 is disengaged from the output 13, which in this gearbox 230 is the input shaft from the power turbine of the gas turbine engine. The clutch 60 therefore prevents the electrically-driven motor/generator 35 and fuel pump 38 from affecting the operation of the output 13. In this gearbox 230, the clutch 60 allows the output 13 to provide continual drive to the hydraulic pump 37, even when disengaged from the output 13.

In the mechanical drive state, the clutch 60 engages the output 13 and is rotated thereby. This drives the internal gearing of the gearbox 230, which in turn drives the motor/generator 35 (i.e. to generate electric power), the fuel pump 38, and the hydraulic pump 37. Since the gas turbine engine 10 is operational, the electric starter 33 is no longer necessary and is therefore decoupled from the compressor 14.

The engine starter 36 can also have an air starter 41 (see FIG. 1). The air starter 41 functions by receiving compressed air from a suitable source, such as the CAC 34, and using this compressed air to rotate the compressor 14 of the gas turbine engine 10, to which it is mechanically coupled. The air starter 41 is directly or indirectly driven by the electrical power supply 50.

There is also disclosed a method for driving accessories of a gas turbine engine having a main electrical power supply and a separate electrical power supply.

The method includes using only the electrical power supply to drive at least one of a cabin air compressor and an engine starter when the gas turbine engine is not operational (e.g. during ground servicing). Alternatively, the electrical power supply can drive at least some of the accessories to offload the power requirements of the gas turbine engine during flight. These accessories include at least the CAC, or the engine starter. As explained above, the electrical power supply can also drive other accessories as well.

The method also includes the step of mechanically coupling an output of the gas turbine engine to an accessory gearbox driving at least one of the accessories, such as the CAC, when the gas turbine engine is operational (e.g. during cruise or flight idle).

In light of the preceding, it can be appreciated that the system 20 disclosed herein and its components provide gains in the cycle efficiency of the gas turbine engine, and help to lower combustion emissions and noise levels during ground servicing of the aircraft. In so doing, the system 20 may in some circumstances obviate the need for an auxiliary power unit (APU).

During ground servicing, an APU generally provides the following: a source of electrical power to the aircraft, a source of pneumatic power for cabin air, and a source of power to start the gas turbine engine. The APU typically provides this functionality with its own accessories. It will be therefore appreciated that the system 20, and its electrical power supply 50 and clutch 60, can provide these services so as to eliminate the need for an APU and its redundant accessories, added complexity, maintenance, emissions, and noise. In this regard, it should be noted that many airports around the world have limited the amount of time that APUs can be used prior to departure, or have prohibited their use outright.

The system 20 therefore allows the gas turbine engines 10 to operate only when it is most efficient to use them, such as during flight. At times where their use would be inefficient, such as during ground servicing, the system 20 provides a dedicated power supply to power the accessories 32 of the gas turbine engines 10. The system 20 therefore allows the fuel-fed gas turbine engines 10 to focus on generating propulsive thrust or lift forces. This addresses the problem of "parasitic" power consumed from the gas turbine engines 10, which is the power drawn from the gas turbine engines 10 and use to power the accessories. This power consumption can be as high as 5%.

Furthermore, the system 20 and its dedicated electrical power supply 50, such as the batteries 20, allow the gas turbine engines 10 to be autonomous, so that they are not dependent on airports or GPUs to provide ground servicing.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An accessory drive system for a gas turbine engine, the gas turbine engine having a main electrical power supply, the accessory drive system comprising:
   a gearbox driving a plurality of accessories including at least a cabin air compressor to provide cabin air and an engine starter to start the gas turbine engine;
   an electrical power supply separate from the main electrical power supply of the gas turbine engine and electrically coupled to the plurality of accessories; and
   a clutch selectively engaging an output of the gas turbine engine to mechanically couple the output to the gearbox, and operating between an electrical drive state wherein the clutch disengages from the output and only the separate electrical power supply provides electrical power to at least one of the cabin air compressor and the engine starter of the plurality of accessories, and a mechanical drive state wherein the clutch engages the output, the output drives the gearbox, and the gearbox directly drives at least one of the plurality of accessories.

2. The system as defined in claim 1, wherein the engine starter has an in-line electric starter mechanically coupled to a compressor of the gas turbine engine.

3. The system as defined in claim 1, wherein the engine starter has a motor mechanically coupled to a hydraulic pump, the hydraulic pump in use supplying hydraulic power to a hydraulic starter mechanically coupled to a compressor of the gas turbine engine.

4. The system as defined in claim 3, wherein the hydraulic pump has a hydraulic accumulator.

5. The system as defined in claim 1, wherein the engine starter has an air starter mechanically coupled to a compressor of the gas turbine engine.

6. The system as defined in claim 1, wherein the separate electrical power supply has at least one battery.

7. The system as defined in claim 6, wherein the engine starter has a generator mechanically coupled to the output of the gas turbine engine to recharge the at least one battery upon the clutch operating in the mechanical drive state.

8. The system as defined in claim 1, further comprising a control unit controlling the selective engagement of the clutch with the output of the gas turbine engine.

9. A gas turbine engine, comprising:
   a main electrical power supply;
   a plurality of accessories including at least a cabin air compressor to provide cabin air, and an engine starter to start the gas turbine engine;
   an electrical power supply separate from the main electrical power supply and electrically coupled to the plurality of accessories; and
   a clutch selectively engaging an output of the gas turbine engine to mechanically couple the output to the plurality of accessories, and operating between an electrical drive state wherein the clutch disengages from the output and only the separate electrical power supply provides electrical power to at least one of the cabin air compressor and the engine starter of the plurality of accessories, and a mechanical drive state wherein the clutch engages the output and the output drives at least one of the plurality of accessories.

10. The gas turbine engine as defined in claim 9, wherein the engine starter has an in-line electric starter mechanically coupled to a compressor of the gas turbine engine.

11. The gas turbine engine as defined in claim 9, wherein the engine starter has a motor mechanically coupled to a hydraulic pump, the hydraulic pump in use supplying hydraulic power to a hydraulic starter mechanically coupled to a compressor of the gas turbine engine.

12. The gas turbine engine as defined in claim 9, wherein the engine starter has an air starter mechanically coupled to a compressor of the gas turbine engine.

13. The gas turbine engine as defined in claim 9, wherein the separate electrical power supply has at least one battery.

14. The gas turbine engine as defined in claim 13, wherein the engine starter has a generator mechanically coupled to the output of the gas turbine engine to recharge the at least one battery upon the clutch operating in the mechanical drive state.

15. A method for driving accessories of a gas turbine engine having a main electrical power supply and a separate electrical power supply, the method comprising:
   mechanically decoupling the output from the accessory gearbox and using only the separate electrical power supply to drive at least one of a cabin air compressor and an engine starter of the gas turbine engine when the gas turbine engine is not operational; and
   mechanically coupling an output of the gas turbine engine to an accessory gearbox so that the accessory gearbox drives at least one of the accessories when the gas turbine engine is operational.

16. The method as defined in claim 15, wherein mechanically coupling the output includes ceasing to drive at least one of the cabin air compressor and the engine starter with the separate electrical power supply.

17. The method as defined in claim 15, wherein using only the separate electrical power supply includes driving an in-line electric starter mechanically coupled to a compressor of the gas turbine engine.

18. The method as defined in claim 15, wherein using only the separate electrical power supply includes driving at least one of the cabin air compressor and the engine starter from a battery.

19. The method as defined in claim 18, further comprising recharging the battery when the gas turbine engine is operational.

* * * * *